US 8,851,098 B2

(12) United States Patent
Thomas

(10) Patent No.: US 8,851,098 B2
(45) Date of Patent: Oct. 7, 2014

(54) RUPTURE SEALING APPARATUS

(76) Inventor: Alan M. Thomas, Willow, AK (US)

( * ) Notice: Subject to any disclaimer, the term of this patent is extended or adjusted under 35 U.S.C. 154(b) by 0 days.

(21) Appl. No.: 13/359,223

(22) Filed: Jan. 26, 2012

(65) Prior Publication Data
US 2012/0186660 A1    Jul. 26, 2012

Related U.S. Application Data

(60) Provisional application No. 61/461,972, filed on Jan. 26, 2011.

(51) Int. Cl.
*F17D 5/02* (2006.01)
*F16K 43/00* (2006.01)
*F16L 55/18* (2006.01)
*B61D 5/00* (2006.01)
*B60P 3/22* (2006.01)
*B65D 90/22* (2006.01)

(52) U.S. Cl.
CPC ...... *B65D 90/22* (2013.01); *B61D 5/00* (2013.01); *B60P 3/2295* (2013.01)
USPC ............... 137/15.11; 137/315.01; 138/97

(58) Field of Classification Search
USPC .......... 137/15.08, 15.11, 315.01, 315.41, 137/315.42, 345, 347, 350; 138/97, 98; 220/203.22, 203.19, 203.23, 203.16, 220/203.11, 203.01, 582
See application file for complete search history.

(56) References Cited

U.S. PATENT DOCUMENTS

| | | | |
|---|---|---|---|
| 635,939 A | 10/1899 | Mason | |
| 3,830,260 A * | 8/1974 | Baviello, Sr. | 138/97 |
| 3,906,880 A | 9/1975 | Hebert | |
| 4,239,416 A * | 12/1980 | Borca et al. | 405/53 |
| 4,415,390 A * | 11/1983 | Smith | 156/187 |
| 5,009,179 A | 4/1991 | Johnson | |
| 5,009,180 A | 4/1991 | Holt | |
| 5,036,786 A | 8/1991 | Uri | |
| 5,038,701 A | 8/1991 | Riddell | |
| 5,119,862 A * | 6/1992 | Maimets et al. | 138/98 |
| 5,165,356 A | 11/1992 | Williams | |
| 5,195,446 A | 3/1993 | Riddell | |
| 5,349,914 A | 9/1994 | Lapo et al. | |
| 5,465,758 A * | 11/1995 | Graf et al. | 138/98 |
| 5,782,196 A * | 7/1998 | Cunningham et al. | 114/229 |
| 5,966,877 A | 10/1999 | Hawes | |
| 6,152,059 A | 11/2000 | Del Raso | |
| 6,206,049 B1 * | 3/2001 | Ward | 138/98 |
| 6,494,156 B1 | 12/2002 | Robinson | |

(Continued)

FOREIGN PATENT DOCUMENTS

| | | |
|---|---|---|
| CH | 478700 | 1/1969 |
| FR | 2288681 | 6/1976 |
| JP | 08035598 | 2/1996 |
| WO | 2010020823 | 2/2010 |

*Primary Examiner* — John K Fristoe, Jr.
*Assistant Examiner* — Michael R Reid
(74) *Attorney, Agent, or Firm* — Simpson & Simpson, PLLC

(57) ABSTRACT

A system for sealing a vessel, including: a sealing assembly including a sheet of material and an actuator; and a bracing assembly including a mesh structure. In response to an actuating signal: the actuator is arranged to dispose the sheet of material along at least a portion of an inner wall of the vessel; and the bracing assembly is arranged to displace the mesh structure such that the mesh structure urges the sheet of material into sealing contact with the at least a portion of the inner wall.

18 Claims, 12 Drawing Sheets

(56) References Cited

U.S. PATENT DOCUMENTS

| | | |
|---|---|---|
| 6,508,189 B2 | 1/2003 | Robinson |
| 6,609,474 B1 | 8/2003 | Robinson |
| 6,672,235 B2 | 1/2004 | Robinson |
| 7,322,306 B2 | 1/2008 | Robinson |
| 2008/0193221 A1 | 8/2008 | Lee et al. |
| 2010/0147857 A1 | 6/2010 | Huang |
| 2011/0139032 A1 | 6/2011 | Shirvinski et al. |
| 2011/0274495 A1 | 11/2011 | Estes |

* cited by examiner

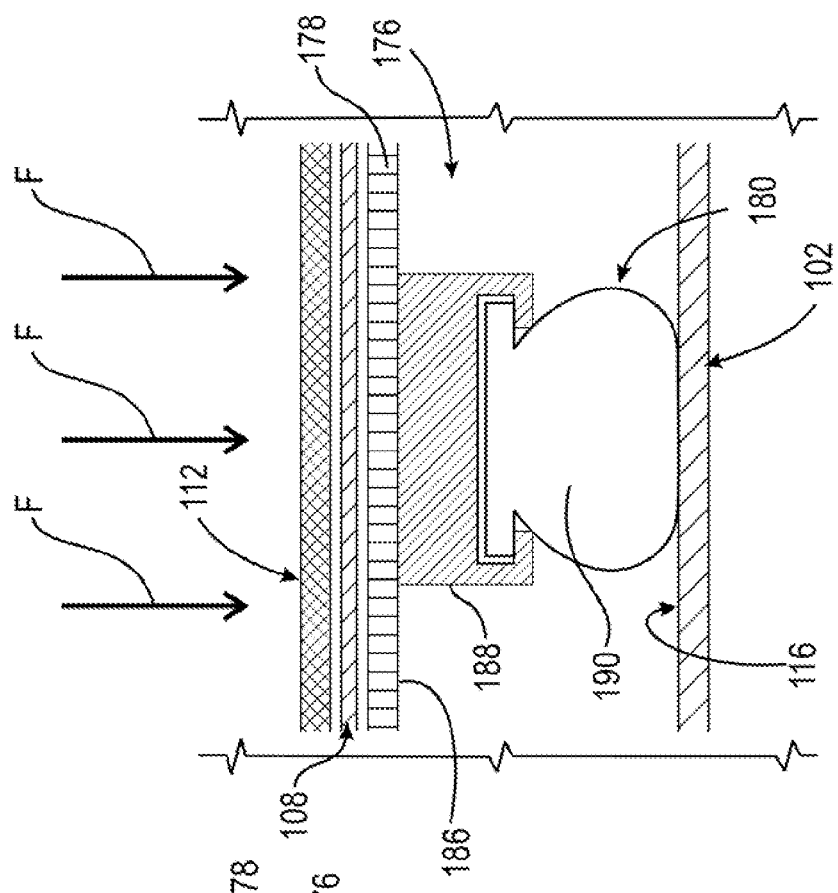
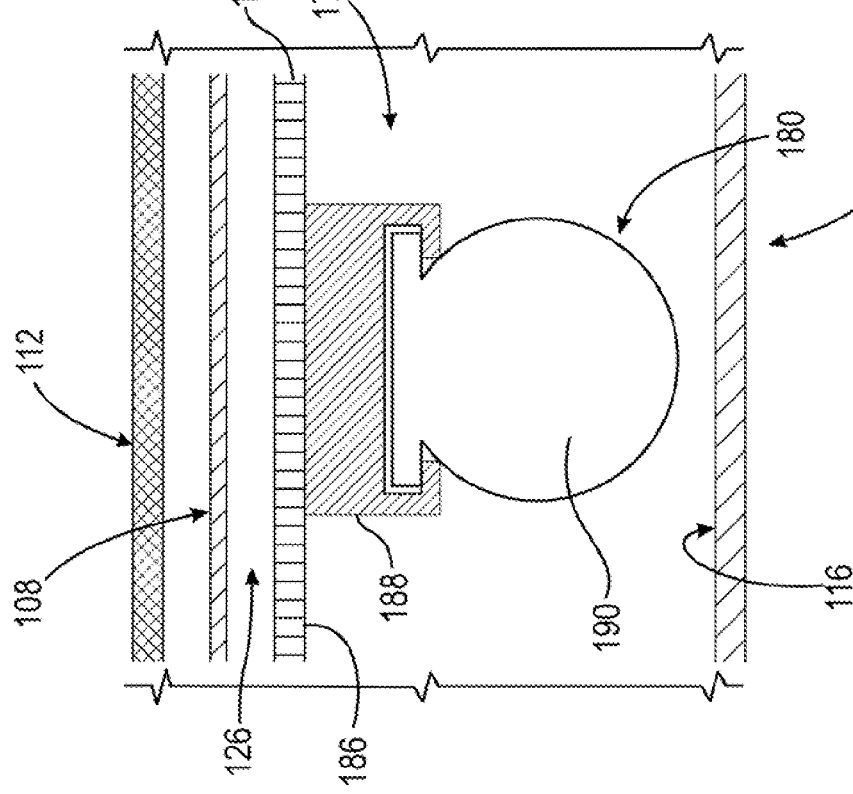

RUPTURE SEALING APPARATUS

CROSS-REFERENCE TO RELATED APPLICATIONS

This patent application claims the benefit under 35 U.S.C. §119(e) of U.S. Provisional Patent Application No. 61/461,972, filed Jan. 26, 2011, which application is incorporated herein by reference.

FIELD OF THE INVENTION

This invention relates to damage control safety devices for railway tank cars, over-the-road tank trucks, bulk storage tanks, and tanking vessels transporting or storing hazardous and non-hazardous liquids, compressed gas products, refined petroleum products and other fluids. In general, the inventive device relates to any storage tank, including, but not limited to marine vessels, all manner of fuel tanks, petroleum product transportation barges, and chemical storage and reaction tanks. For example, the invention relates to the prevention of fluid loss from pressurized and non pressurized railway tank cars and over-the-road tank trucks damaged during a collision, train derailment or other catastrophe resulting in leaks from tank shell/wall injuries.

BACKGROUND OF THE INVENTION

It is known that hazardous and non-hazardous fluid transportation and storage tanks of all types are susceptible to damage and ruptures, e.g., punctures through the tank wall, and leaking from a variety of mechanisms, e.g., valves and seals. An example of a known technology taught in U.S. Pat. No. 635,939 mitigates fluid loss by employing canvas patches using electromagnets to hold the patches in place over a hole or rupture in a petroleum transportation marine vessel thus reducing fluid loss. U.S. Pat. No. 5,009,179 shows an oil-impervious flexible sheet held in place along top and side edges by electromagnets while the bottom edge is left open. In U.S. Pat. No. 5,036,786, a patch is disclosed which includes a steel mesh blanket and a steel sheet, where the patch includes electromagnetic bars therein. U.S. Pat. No. 5,165,356 discloses a patch including a rigid plate member, a cushion layer, and a pliable sealing layer, held in place against a ruptured wall by electromagnets. Each of the foregoing references discloses a variation of a patch held in an operative position by electromagnets and thereby attached in some manner at the periphery of the patch.

U.S. Pat. Nos. 5,038,701 and 5,195,446 each disclose a flexible material for covering an opening in the hull of a ship. The covering material includes four layers of material with an array of electromagnets embedded between two of the layers. U.S. Pat. No. 5,009,180 discloses a patch system free of electromagnets that utilizes a series of ropes or cables, sealing hoses, inflatable bladders, and the like, to set a sheet in place covering a rupture in the hull of a ship.

The foregoing technologies are set up and applied manually, typically some time after a tank has been injured. Each mechanism comprises a patch or flexible blanket applied over an existing hole or rupture in the wall of a tank or petroleum transportation marine vessel. It should be appreciated that numerous attempts have been made to mitigate fluid loss from damaged and leaking containers; especially attempts at controlling the spillage of bulk liquid cargos such as oil from petroleum tanker ships. A known method is an attempt to control such leakage through the ship's design and construction of a second hull where an inner hull would protect the cargo from being lost should damage be inflicted upon the outer hull of the ship. However, this method is extremely expensive prohibiting most from obtaining tankers of such design. Another negative consideration of the double hull tanker design involves a substantial decrease in a ship's stability.

There also exists in the art other methods and devices that are not an integral part of the tanker ship or storage container's structural design that attempt to mitigate fluid loss from a damaged area. Such devices are either pre-deployed as in the case of an inner liner or liquid barrier, which offers limited protection by deflecting and yielding to the energy of impact, or employed sometime after an accident or catastrophic event occurs, as in the case of expandable bladder and pump operated liquid transfer systems. A further design provides for a protective layer placed against the hull of a tank with a flexible liner placed on top of the protective layer. The transported liquid, e.g., oil, is filled into the compartment containing the protective layer and containment liner arrangement. However, this arrangement only offers limited protection as it anticipates only a finite number of accident scenarios and must withstand the forces of impact as well as abrasion, cuts, tears and punctures associated with a violent tanker collision and possible catastrophic tank failure.

Yet another design employs a flexible bladder and pump system wherein the pump system transfers the fluid cargo from the damaged tank to a containment bladder in the event of a tank rupture. However, this method is prone to significant fluid loss because of the inherent lag time during which the transfer of large volumes of fluid from the original tank to the flexible bladder container. Moreover, several devices relate to double walled tanks for railway tank cars and underground storage tanks which provide for an outer tank and an inner containment tank with energy absorbing areas in between. These designs are static, preventative devices integral to a tanks structure and do not anticipate leaks due to failure of valves, seals or fittings. Further, the double walled tank construction is static and cannot respond to an active leak rendering such preventive measures useless once a leak occurs for any reason.

U.S. Pat. No. 3,906,880 discloses an oil leak pollution control device for containing oil within the hull of an oil tanker that has been damaged. Operatively, this device requires that it is placed manually by crew members creating a disadvantage by not being automatically deployed at the time of an accident. Additionally, the foregoing device employs the use of a pump to recover oil from a damaged compartment by transferring it to a vinyl container during which time substantial amounts of fluid would be lost through the damaged area of the tank shell.

U.S. Pat. No. 5,349,914 discloses a device for impeding the spillage of liquid from a damaged hull of a water travelling vessel. However, this device is a static buffering bladder/liner/container system and suffers the distinct disadvantage of having to survive an impact or other catastrophic tank failure to be useful. Additionally, this device is deficient in that it lacks the ability to respond to an active leak should one occur.

U.S. Pat. No. 6,152,059 discloses a device and method for recovering oil by pumping the oil into a prepositioned expandable bladder with the bladder serving to retard the flow of oil out from a damaged oil tanker as well as attempting to retard the flow of seawater into the tank. This method of sealing relies on sufficient pressure being exerted as the weight of the oil presses the bladder up against the wall of the damaged tank. The clear disadvantage of this system is the lag time of the pumping process during which time oil is being lost to the sea. Additionally, the sealing quality of the bladder pressing against the tank wall is directly proportional to the amount of oil contained within the bladder which is variable and therefore incapable of providing a consistent positive seal.

U.S. Pat. Nos. 6,494,156, 6,508,189, 6,609,474, 6,672,235 and 7,322,306 disclose a family of non-permeable bladder containers within a meso-skeletal structure and various methods for connecting, suspending and protecting such bladder containers. Once again however, the static bladder/liner containment technology fails to meet the objectives of an automatic emergency response to a damaged and actively leaking container.

It is apparent that each of the foregoing systems and methods suffers from a variety of drawbacks. None of the aforementioned technologies describes a system which is a preinstalled, existing as a permanent safety system capable of being deployed instantaneously upon demand as an immediate response to an accident. Additionally, no prior technology mentioned above addresses pressure applications such as those encountered in pressurized tanks, e.g., tank trucks or railway tank cars, transporting hazardous gaseous materials under pressure. Furthermore, none of the technologies discussed above are described as being fully automatic in their operation or are otherwise proactively initiated by impact or pressure differential or other electronic sensors. Finally, all of the preceding technologies address only the localized area surrounding a specific rupture site whereas none of the aforementioned technologies provides for complete coverage of the entire tank wall surface area simultaneously.

BRIEF SUMMARY OF THE INVENTION

According to aspects illustrated herein, there is provided a system for sealing a vessel, including: a sealing assembly including a sheet of material and an actuator; and, a bracing assembly including a mesh structure. In response to an actuating signal, the actuator is arranged to dispose the sheet of material along at least a portion of an inner wall of the vessel; and, the bracing assembly is arranged to displace the mesh structure such that the mesh structure urges the sheet of material into sealing contact with the at least a portion of the inner wall.

According to aspects illustrated herein, there is provided a system for sealing a vessel, including: a bracing assembly including a mesh structure and at least one bracing actuator engaged with the mesh structure; and, a sealing assembly including an actuator, a rotatable spindle, a sheet of material spoolable about the rotatable spindle, the sheet of material includes first and second ends, wherein the second end is connected to the spindle, and a plurality of cables at least indirectly connected to the first end of the sheet of material, at least partially disposed in a space between the mesh structure and an inner wall of the vessel, and engaged with the actuator. In response to an actuating signal, the actuator is arranged to retract the plurality of cables to pull the sheet of material off the rotatable spindle and through the space between the mesh structure and the inner wall, and dispose the sheet of material along at least a portion of the inner wall. In response to an actuating signal, the at least one bracing actuator is arranged to displace the mesh structure such that the mesh structure urges the sheet of material into sealing contact with the at least a portion of the inner wall.

According to aspects illustrated herein, there is provided a method for sealing a vessel using a system including a sealing assembly with a sheet of material and an actuator and including a bracing assembly with a mesh structure, the method including: receiving an actuating signal; disposing, using the actuator, the sheet of material along at least a portion of an inner wall of the vessel; and, displacing the mesh structure to urge the sheet of material into sealing contact with the at least a portion of the inner wall.

Broadly, the present invention provides a temporary pollution prevention counter measure. The present invention includes a mechanical safety apparatus that is mounted inside of a fluid storage tank or pressure vessel. The present invention automatically deploys a synthetic sealing material from a storage roll and locks such sealing material into place against at least a portion of an inner wall of the tank or vessel. It is a general object of the present invention to prevent or reduce the volume of unwanted spills or leaks of hazardous or non-hazardous fluids from a compromised tank.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 10A is a partial cross sectional view of an embodiment of a present invention rupture sealing apparatus showing a mesh structure, a sealing sheet material and a sealing screen assembly in an uncompressed condition;

FIG. 10B is a partial cross sectional view of an embodiment of a present invention rupture sealing apparatus showing a mesh structure, a sealing sheet material and a sealing screen assembly in a compressed condition;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. As used herein, "sealing contact" is intended to mean that one structure contacts another structure in such a way to provide a fluid seal therebetween. Although any methods, devices or materials similar or equivalent to those described herein can be used in the practice or testing of the invention, the preferred methods, devices, and materials are now described.

Figure 1:
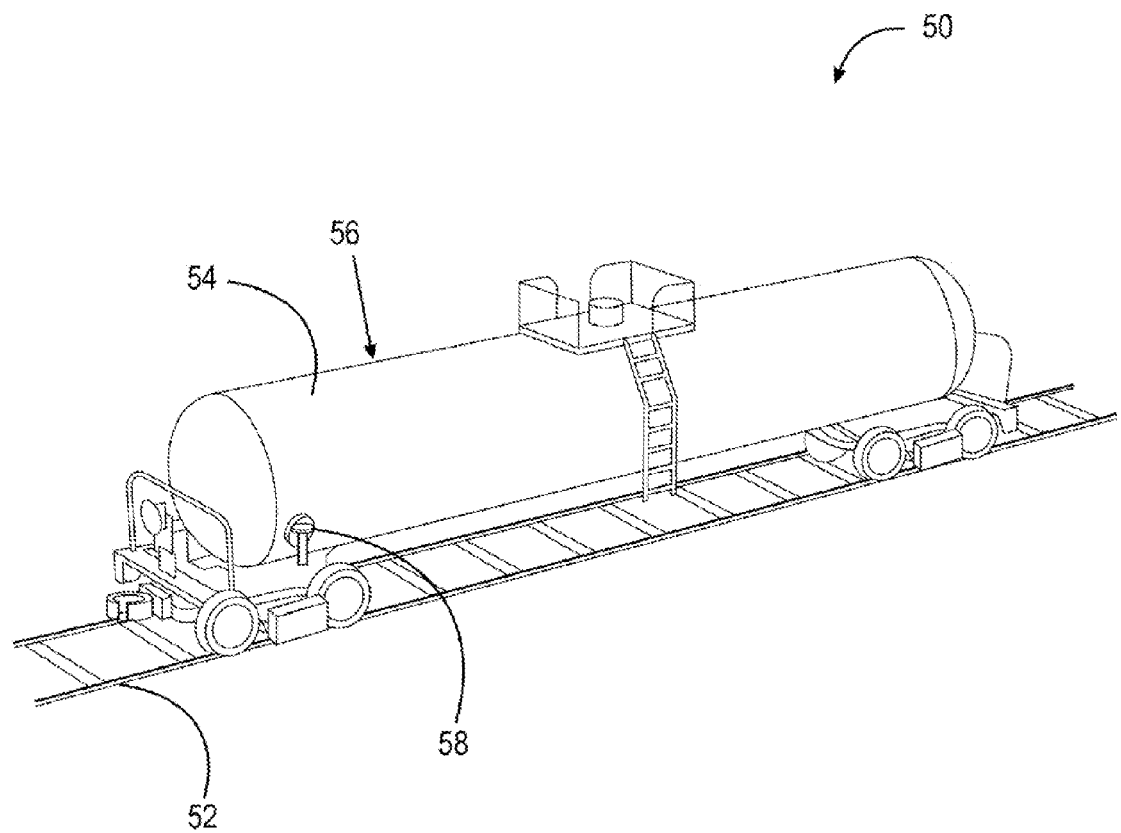
FIG. 1 is a perspective view of a typical railway tank car.

FIG. 1 is a perspective view of railway tank car 50. Railway tank car 50 is shown as an example of one type of tank or vessel within which a present invention rupture sealing apparatus may be utilized. Tank car 50 may derail from rails 52 thereby causing a failure in wall 54 of tank 56. In addition to catastrophic failures of wall 54, tank 56 may leak its contents due to a failure of a seal or a valve, e.g., valve 58. The foregoing failures are mitigated by utilizing a present invention rupture sealing apparatus.

Figure 2:
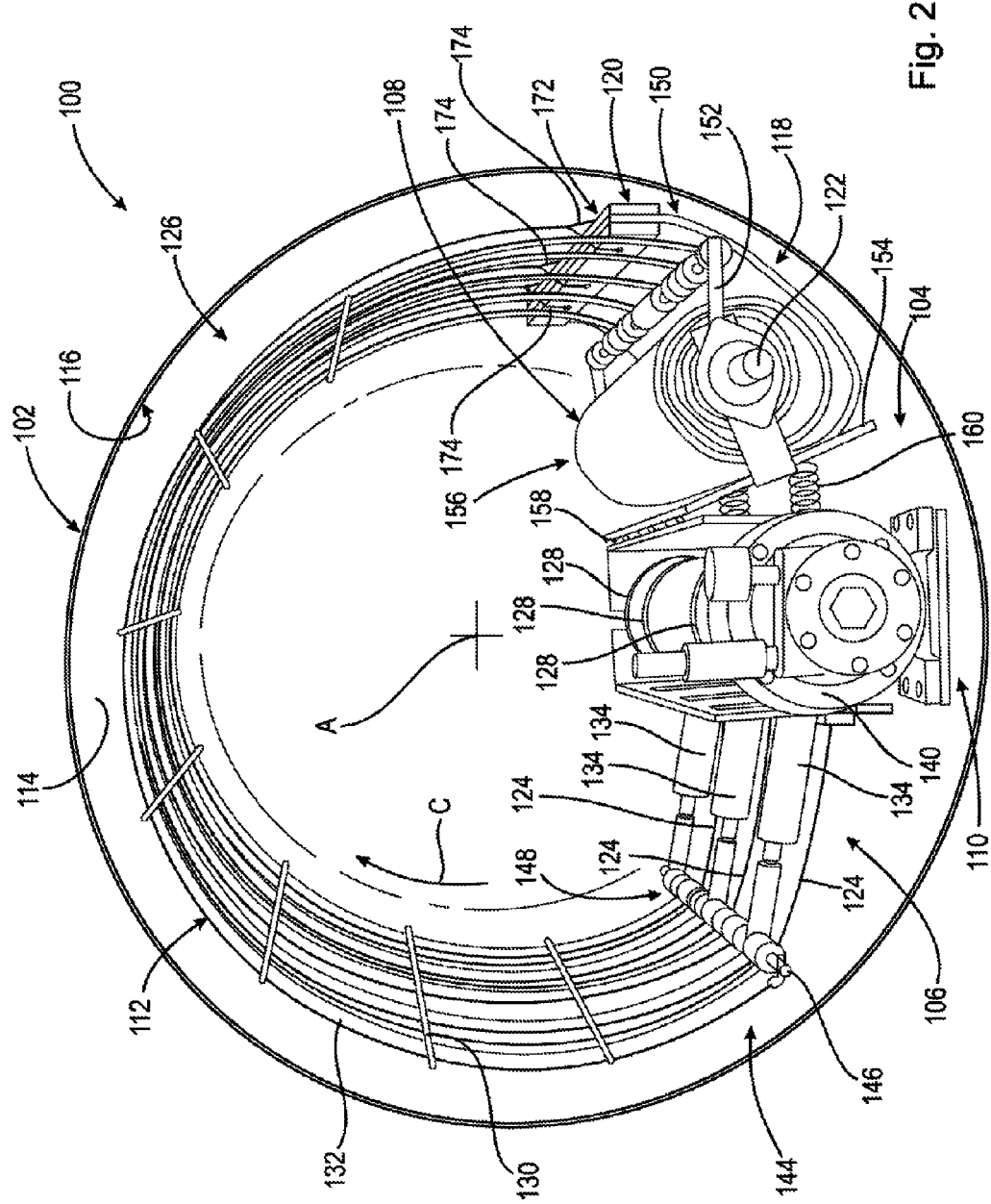
FIG. 2 is a perspective view of a portion of an interior area of a tank having an embodiment of a present invention rupture sealing apparatus arranged therein.

FIG. 2 is a perspective end view of system 100 for sealing vessel 102. System 100 includes sealing assembly 104 and bracing assembly 106. Assembly 104 includes sheet of material 108 and actuator 110. Bracing assembly 106 includes mesh structure 112. In general, material 108 is impermeable to fluids. Any material known in the art can be used for material 108. Material 108 can be selected for compatibility and impermeability with respect to a fluid contained within vessel 102. Various alternate embodiments of material 108 are more fully described infra. Actuator 110 can be any actuator known in the art, including, but not limited to, an electric actuator, a hydraulic actuator, or a pneumatic actuator.

In response to an actuating signal, for example, indicating a leak in vessel 102, actuator 110 is arranged to dispose sheet of material 108 along at least portion 114 of inner wall 116 of vessel 102. Bracing assembly 106 is arranged to displace mesh structure 112 such that mesh structure 112 urges sheet of material 108 into sealing contact with portion 114.

In an embodiment, sealing assembly 104 includes storage element 118 for holding at least a portion of sheet of material 108. Actuator 110 is arranged to operate on end 120 of sheet of material 108 to draw sheet of material 108 away from storage element 118 to dispose sheet of material 108 along portion 114. In an embodiment, storage element 118 includes rotatable spindle 122 about which the portion of sheet of material 108 is spooled, and the opposite end of sheet of material 108 is fixed to spindle 122. In an embodiment, rotatable spindle 122 is spring loaded to resist rotation of spindle 122 to unspool sheet of material 108. Thus, as sheet 108 is withdrawn from spool 122, the spring load keeps sheet 108 under tension to prevent undesirable sagging of sheet 108.

In an embodiment, sealing assembly 104 includes cables 124 engaged with end 120 and at least partially disposed in space 126 between mesh structure 112 and inner wall 116 of vessel 102. Actuator 110 is arranged to pull the plurality of cables 124 to draw sheet of material 108 through space 126 and along portion 114. In an embodiment, actuator 110 includes reels 128 and actuator 110 spools and unspools cables 124 from reels 128 to displace sheet of material 108. In an embodiment, mesh structure 112 includes members 130 aligned with longitudinal axis A for vessel 102 and members 132 connected to members 130. Members 132 are disposed substantially orthogonal to members 130. It should be appreciated that although members 130 and 132 are arranged substantially orthogonal to each other, alternate arrangements are also possible, e.g., members 130 and 132 may be arranged to form a rhombus or a parallelogram therebetween, and such variations are within the scope of the claims. In other words, members 130 and 132 may be arranged at acute and obtuse angles relative to each other.

In an embodiment, bracing assembly 106 includes at least one bracing actuator 134 connected to mesh structure 112. In an embodiment, bracing assembly 106 includes three actuators 134, for example, as shown in FIG. 2. Actuators 134 are arranged to displace mesh structure 112 toward inner wall 116 to urge sheet of material 108 into sealing contact with at least a portion of inner wall 116, e.g., portion 114. In an embodiment, bracing actuators 134 are arranged to urge mesh structure 112 at least partially in a circumferential direction C to urge sheet of material 108 into sealing contact with at least a portion of inner wall 116, e.g., portion 114. Bracing actuators 134 can be any actuator known in the art, including, but not limited to hydraulic or pneumatic cylinders.

Figure 3:
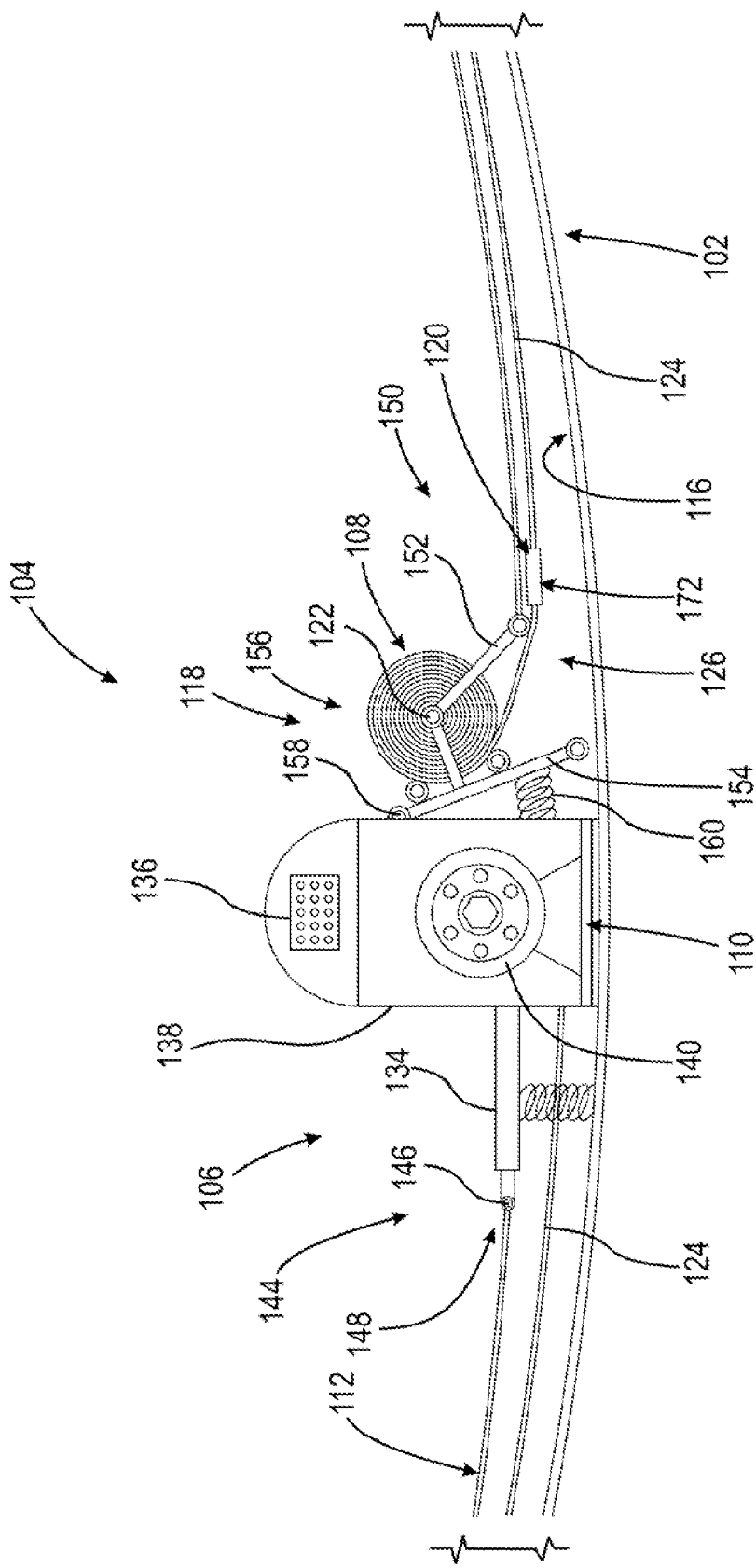
FIG. 3 is a front elevational view of a portion of an interior area of a tank having an embodiment of a present invention rupture sealing apparatus prior to deployment of a sheet of sealing material.
Figure 4:
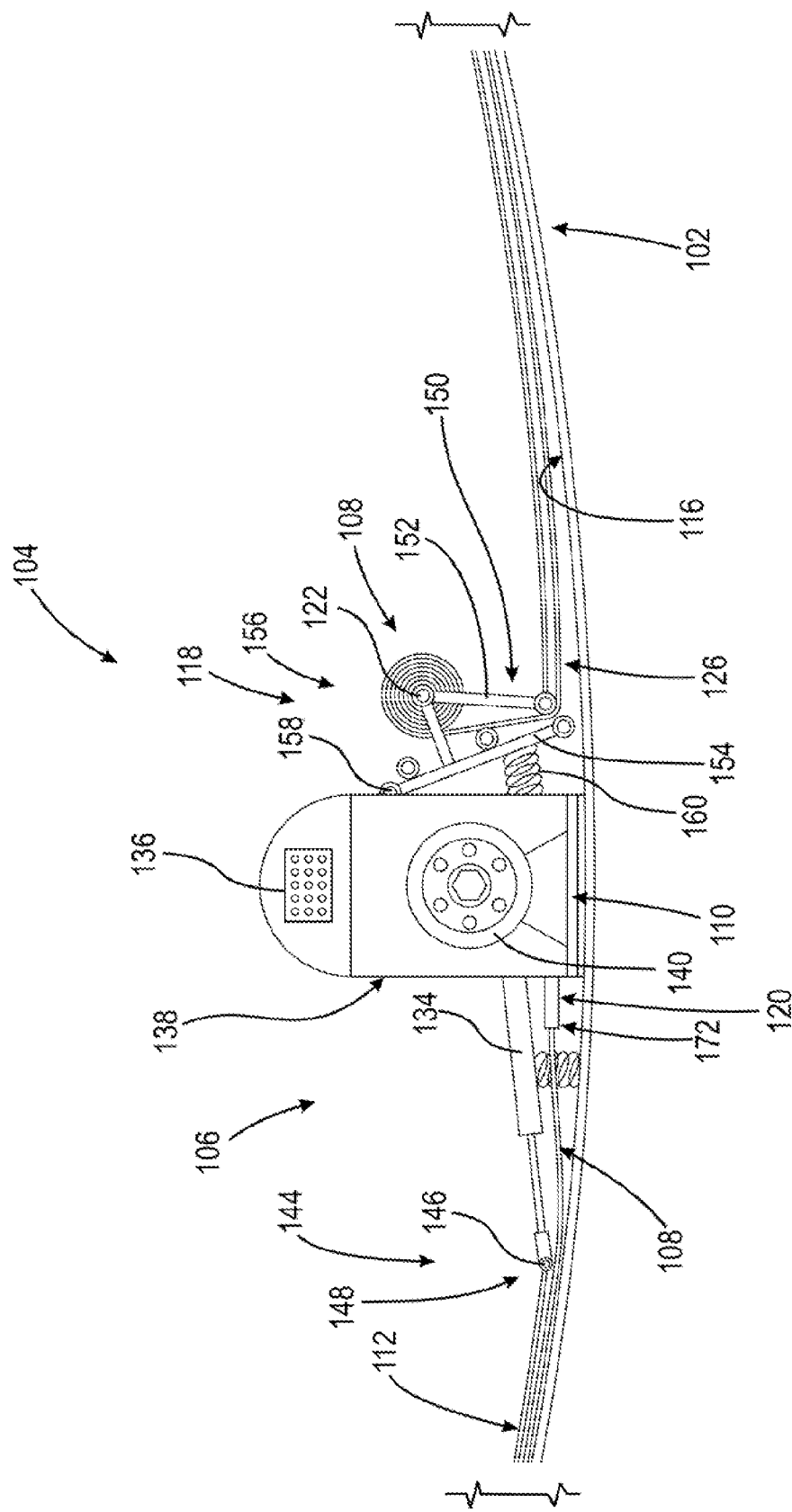
FIG. 4 is a front elevational view of a portion of an interior area of a tank having an embodiment of a present invention rupture sealing apparatus after deployment of a sheet of sealing material.
Figure 5:
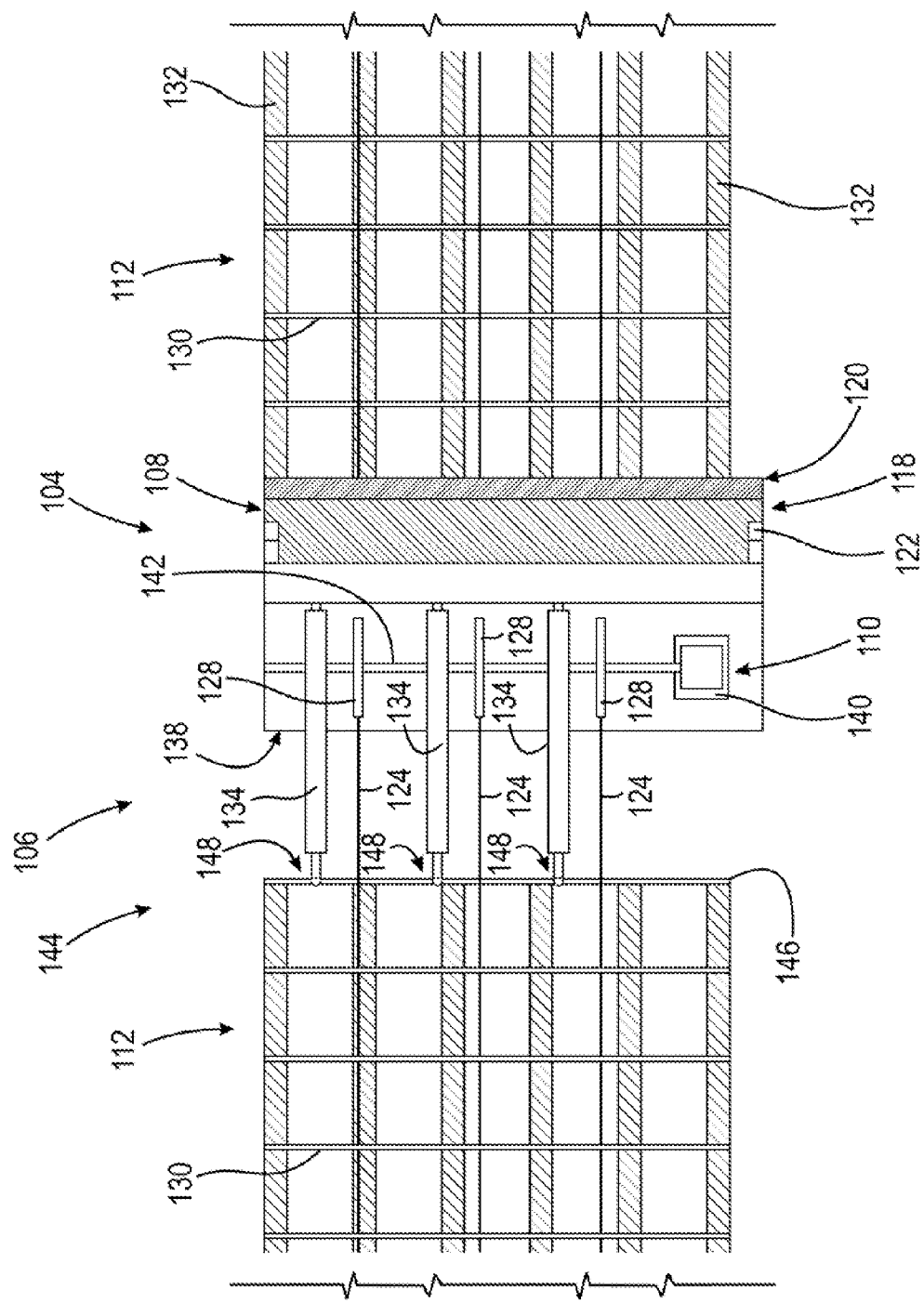
FIG. 5 is a top plan view of a portion of an embodiment of a present invention rupture sealing apparatus.
Figure 6:
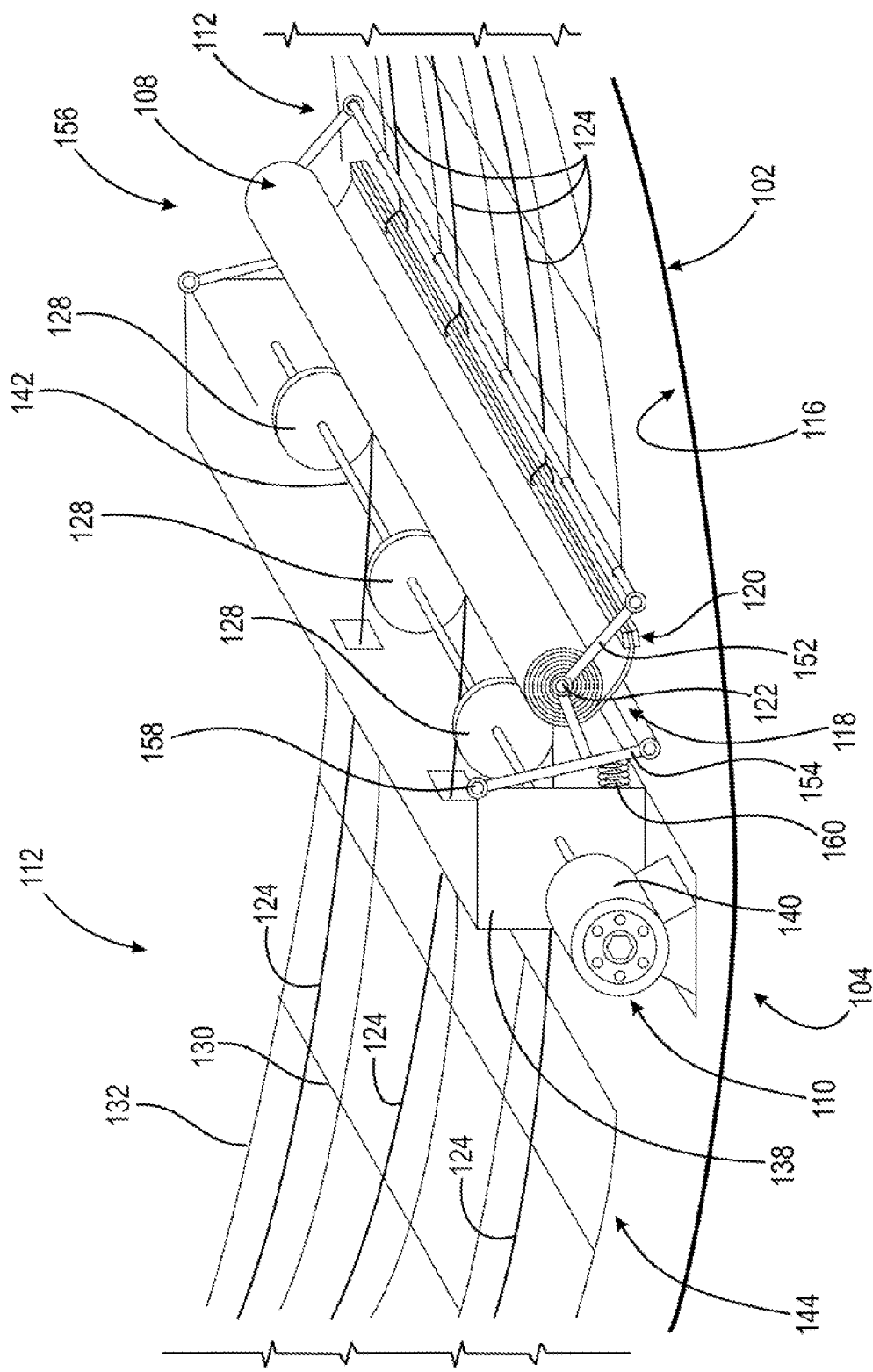
FIG. 6 is a front perspective view of a portion of an embodiment of a present invention rupture sealing apparatus.
Figure 7:
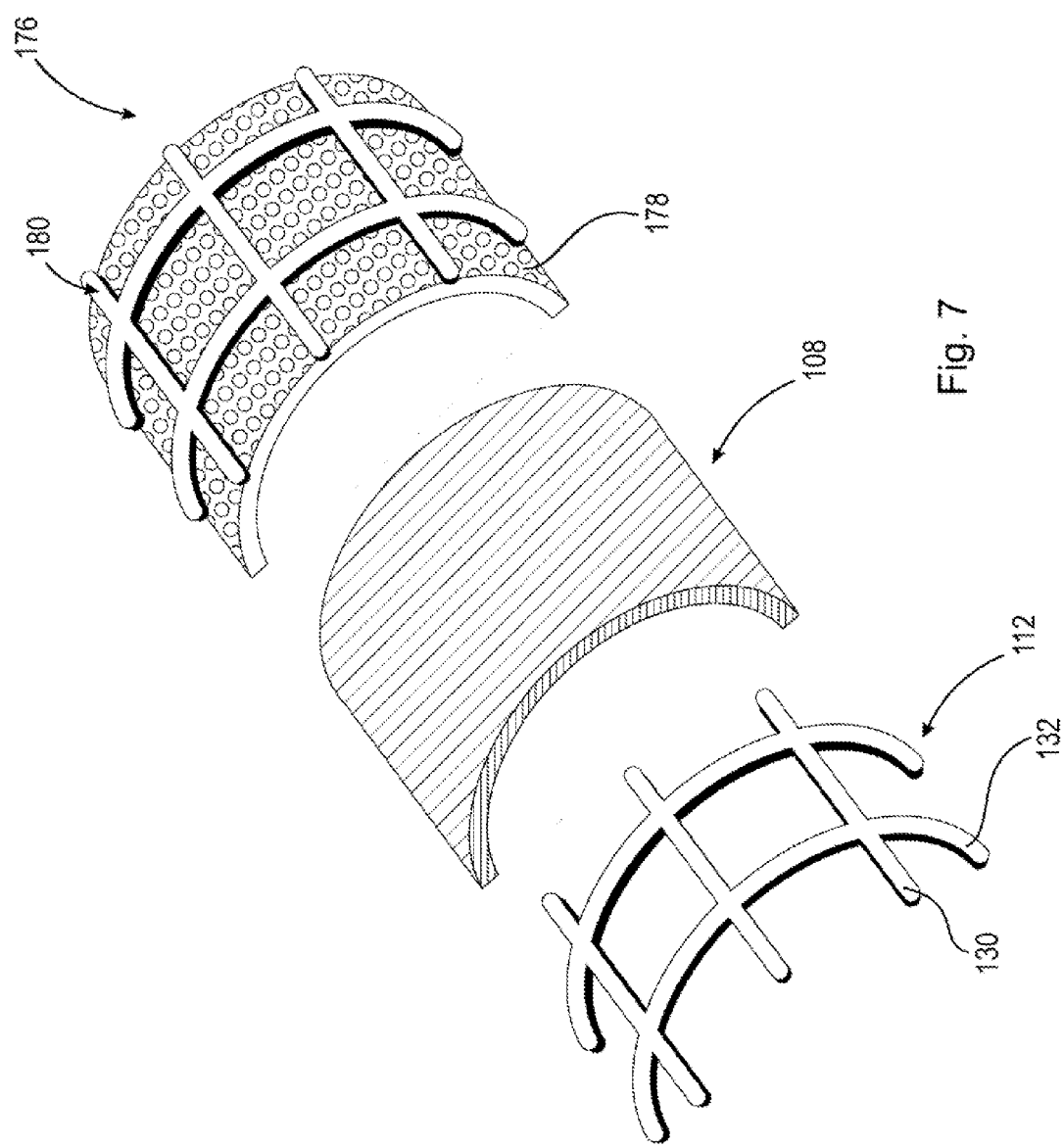
FIG. 7 is an exploded perspective view of a portion of an embodiment of a present invention rupture sealing apparatus showing a portion of a bracing assembly, a portion of a sealing sheet material and a portion of a sealing screen assembly comprising a screen and a gasket array.
Figure 8:
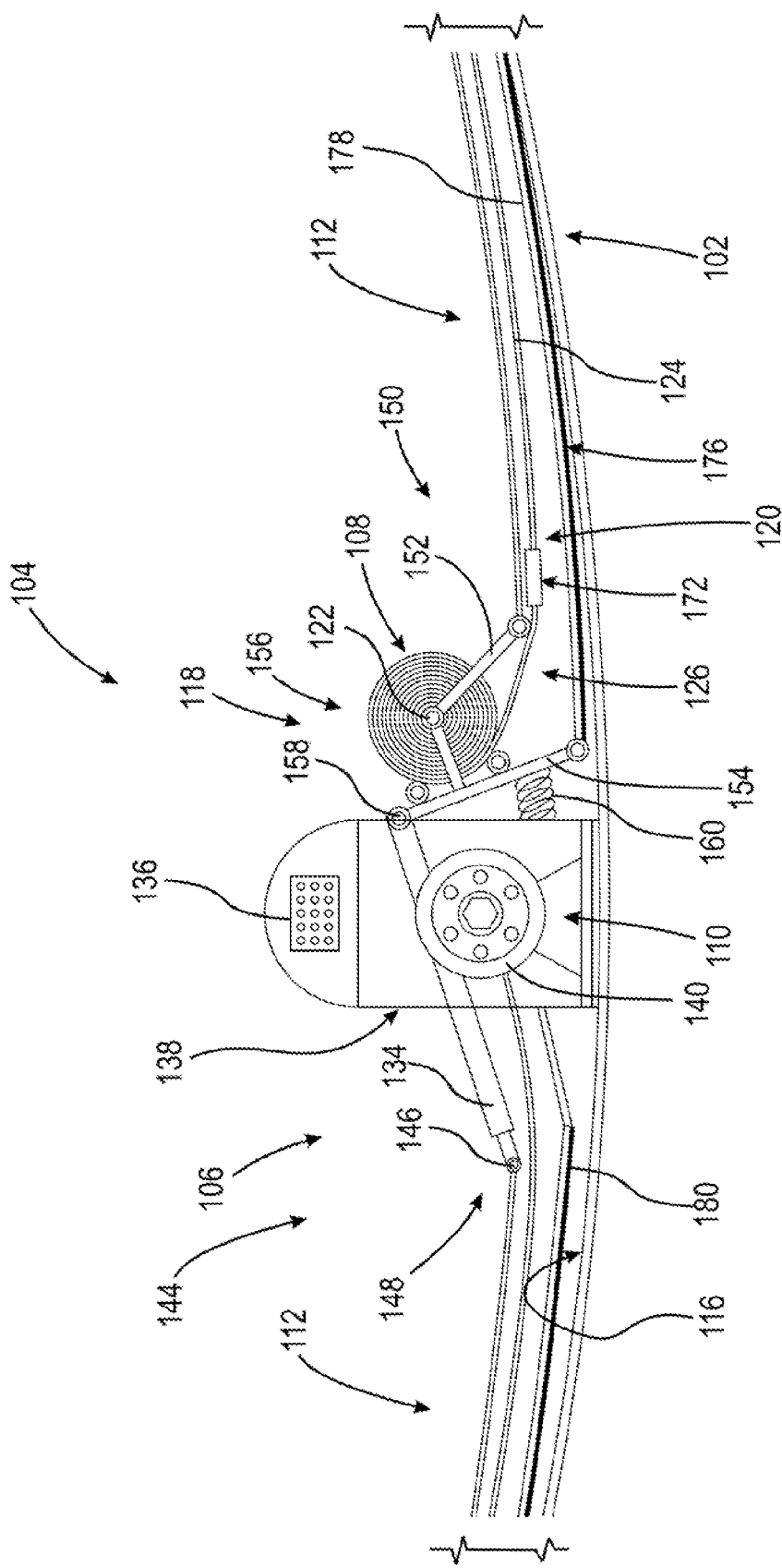
FIG. 8 is a front elevational view of a portion of an interior area of a tank having an embodiment of a present invention rupture sealing apparatus including a sealing screen assembly arranged between the inner wall of the tank and the sealing sheet material.

The following is a further discussion of various embodiments of the present invention rupture sealing apparatus. As shown in FIGS. 3 and 4, integrated data gathering and processing unit 136 analyzes data taken from various sensors reporting the current conditions of the tank or tank car itself as well as the fluid materials within. Sensors may include but are not limited to: a global positioning system (GPS), an inertial sensor, an impact sensor, a liquid level sensor, a pressure differential sensor, a gyroscopic sensor, an accelerometer, a laser valve measurement sensor, a sonic valve measurement sensor, an electronic valve measurement sensor and combinations thereof. If a failure condition, e.g., tank rupture or valve failure, is detected by data gathering and processing unit 136 indicating a leaking tank, a signal, e.g., an actuating signal, is sent to initiate the present invention rupture sealing system.

In an embodiment, storage case 138 contains the apparatus for drawing sheet of material 108 about inner wall 116 of vessel 102, as described above. Such apparatus may include but is not limited to motors, gears, cables, all of which are discretely known to one of ordinary skill in the art; however, heretofore unknown in the arrangement described herein. Furthermore, such apparatus deploys, advances and tensions the synthetic sealing material blanket, e.g., sheet of material 108. Motor 140 is connected to shaft 142 upon which a series of spools or reels 128 are mounted. It should be appreciated that in addition to the pneumatically operated drive motor depicted in the figures, other drive systems may be used. For example, a direct current electric motor connected to a battery source may be included in a liquid proof case, or a hydraulically driven motor may be used. The original motor and such alternate motors may require gear reduction prior to connection to the spools. The foregoing motors are within the spirit of the claimed invention. In an embodiment, spools 128 are located roughly equidistant from each along the length of shaft 142. As described above, cables 124 are connected to each spool 128. In an embodiment, cables 124 are stainless steel cables. Cables 124 trace a path around the exterior of a permanently installed skeletal structure, e.g., mesh structure 112. It should be further appreciated that cables 124 may take other forms, e.g., synthetic straps, belts or chains. In some embodiments using chains, the spools may be replaced by sprockets thereby providing an alternate means of drawing the sealing barrier blanket about the skeletal or mesh structure.

In an embodiment, mesh structure 112 comprises of a series of rolled and formed hoops 132 that serve as individual ribs with each rib being joined together by way of cross members 130. The skeletal structure traces a path entirely around inner wall 116 of vessel 102, with one end of the ribs, i.e., end 144, being connected by way of common rod 146 to a series of synchronized hydraulic or pneumatic cylinders, i.e., cylinders 134, at each respective piston rod end 148, while the other end of the skeletal structure is connected to end 150 of swing arm 152.

Steel plate 154 is attached to storage case 138 whereon a large roll of a multi-layered synthetic sealing material is mounted, e.g., rolled material 156. Steel plate 154 is attached to storage case 138 by hinge 158 and is propped outwards away from the wall of storage case 138 by spring 160. In some embodiments, spring 160 is a heavy gauge spring. In some embodiments, stainless steel plate 154 is supported against storage case 138 by spring 160. Spring 160 provides back pressure during deployment of bracing assembly 106.

Figure 12:
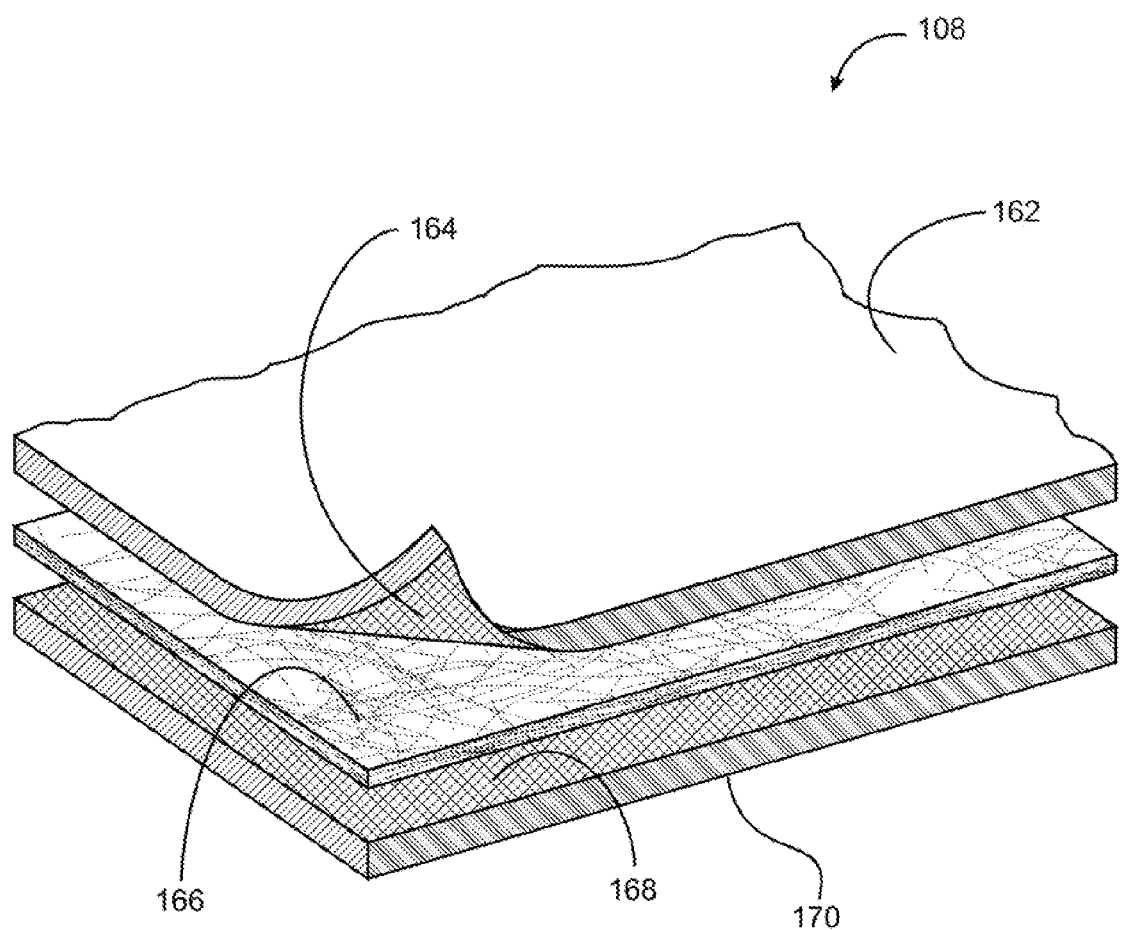

As shown in FIG. 12, an embodiment of the synthetic sealing barrier blanket, e.g., sheet of material 108, comprises five separate layers configured and deployed as a single fluid impervious blanket. The outermost layer, i.e., layer 162, forms a sealing skin and consists of synthetic or natural latex, silicone, neoprene or other similar flexible or rubberized material that provides for a pliable sealing surface at the working face contacting with inner wall 116 of tank 102. Layer 164 is bonded to layer 162. In an embodiment, layer 162, e.g., a neoprene material, is glue bonded to layer 164, e.g., a jersey type mesh fabric. The third or middle or core layer of the sealing barrier, i.e., layer 166, is not bonded to the other layers and provides reinforced tensile strength and a degree of axial rigidity to the sealing barrier blanket. In an embodiment, layer 166 comprises a melt blown synthetic fiber plastic material. The fourth and fifth layers, i.e., layers 168 and 170, respectively, are substantially similar or identical to the first and second layers i.e., layers 162 and 164, respectively; however, layers 168 and 170 are assembled in reverse order to form a backing. In other words, the exposed or outer layers of the sealing barrier blanket, i.e., layers 162 and 170, each provide pliable sealing surfaces. All five layers are sandwiched by clamping device 172 at leading edge 120 and are automatically deployed around the outside of the preinstalled rib cage structure as a single unit.

The nature and mode of operation of an embodiment of the present invention is now described. In the event of extreme circumstances such as a train derailment or other accident resulting in injury to the tank shell that causes a leak, a sensor connected to data gathering and processing unit 138 will send a signal to initiate the system. After a suitable time delay, an actuating signal is then transmitted to activate the deployment mechanism. In some embodiments, the deployment mechanism comprises motor 140 which in turn rotates shaft 142 upon which a series of spools 128 is attached. Each of spools 128 is connected to stainless steel cable 124 having fasteners 174 arranged at the ends of cables 124 opposite spools 128. When triggered, shaft 142 is turned and spools 128 rapidly draw up stainless steel cables 124. Fasteners 174 are connected to leading edge 120 of the blanket of synthetic sealing material, i.e., sheet of material 108, by way clamping device 172. In some embodiments, clamping device 172 comprises two pieces of bar stock that sandwich the layers of the blanket of synthetic sealing material therebetween.

In an embodiment, the deployment and sealing actions of the apparatus can be broadly described as comprising three stages: rapid deployment of the synthetic sealing material barrier blanket; extension of the hydraulic or pneumatic cylinders thereby positioning the sealing material against the inner wall of the tank or vessel by expanding the skeletal or mesh structure; and, further hydraulic action compressing the material against the inner wall of the tank thereby producing a complete seal. When the deployment mechanism is energized and the stainless steel cables are reeled in about the spools, the barrier blanket is deployed from the storage roll and drawn around the outside of the permanent skeletal or mesh structure. This skeletal or mesh structure complimentarily mates with the inner wall of the tank or vessel. Once the sealing barrier blanket is deployed around the exterior of the skeletal or mesh structure, the barrier blanket is in a slightly stretched and tensioned state. During this initial stage of deployment, the skeletal or mesh structure is offset, i.e., retracted in and away from the inner wall of the tank or vessel by a predetermined distance, as can be seen in FIGS. 2 and 3.

Immediately following the deployment and tensioning of the synthetic sealing barrier blanket, the synchronized hydraulic or pneumatic cylinders are activated. The extending action of the hydraulic or pneumatic cylinders flexes the skeletal or mesh structure outwards and simultaneously pivots the swing arm downward to mechanically place the barrier blanket against the inner wall of the tank or vessel, as can be seen in FIG. 4. The continued hydraulic or pneumatic action then provides compressive force to one end of the skeletal structure to lock in position the dynamic pliable synthetic leak sealing outer layer of the barrier against the inner wall of the tank or vessel. The foregoing steps permit the present invention to completely seal multiple leaks or failures both simultaneously and instantaneously.

In some embodiments of the present invention, a further layer is included between the sealing barrier blanket and the inner wall of the tank or vessel. Such an additional layer fortifies the system in that it creates a physical separation between the sealing barrier blanket and the failure that has occurred in the wall of the tank or vessel. For example, if the tank or vessel is ruptured inwardly, sharp edges may be exposed to the sealing barrier. In order to prevent tearing or failure of the sealing barrier blanket, the additional layer is included. The following is best understood in view of FIGS. 7 through 11.

Figure 9:
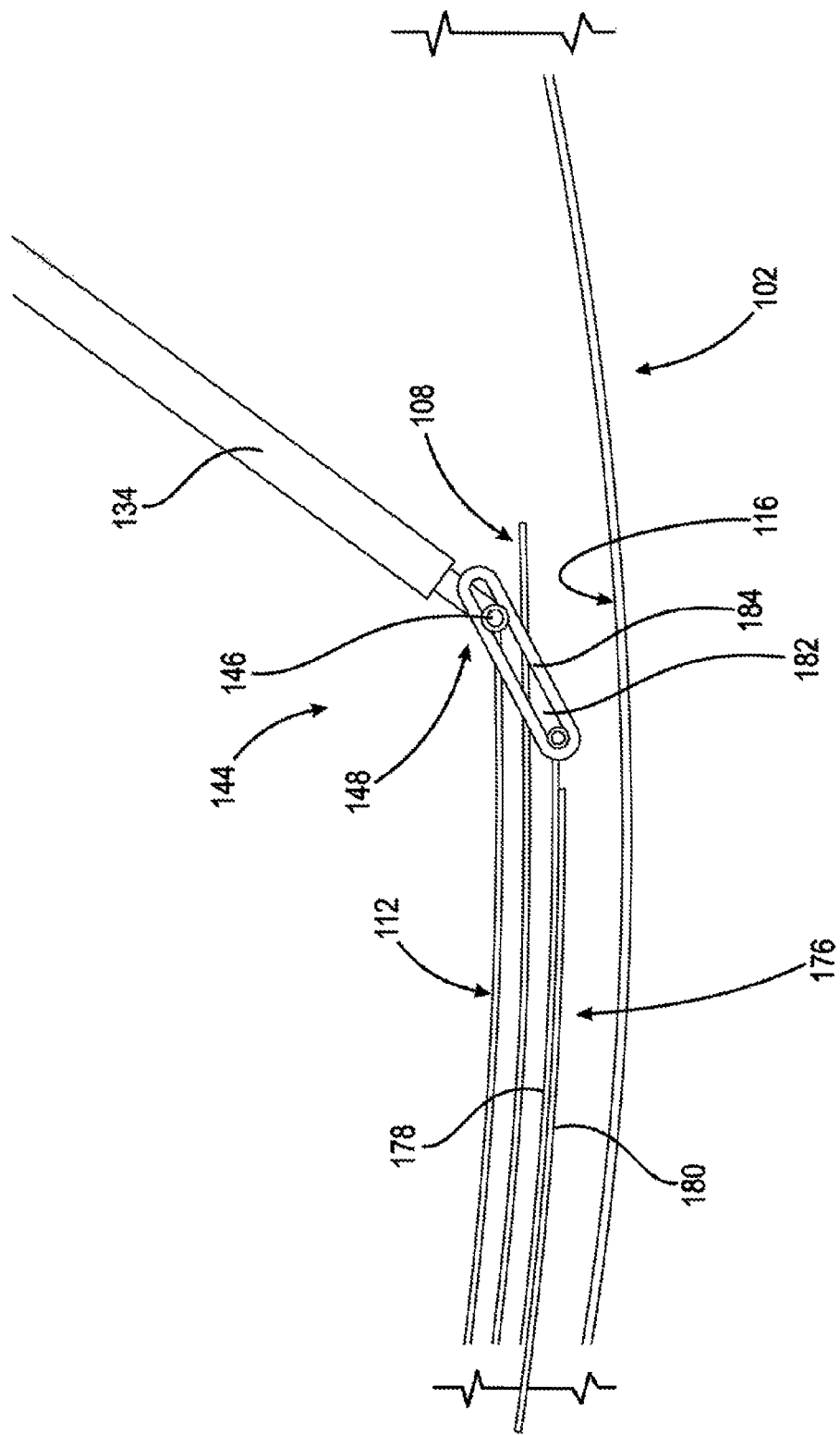
FIG. 9 is a front elevational view of a portion of an interior area of a tank having an alternate embodiment of connecting a bracing actuator to a mesh structure and a sealing screen assembly.
Figure 11:
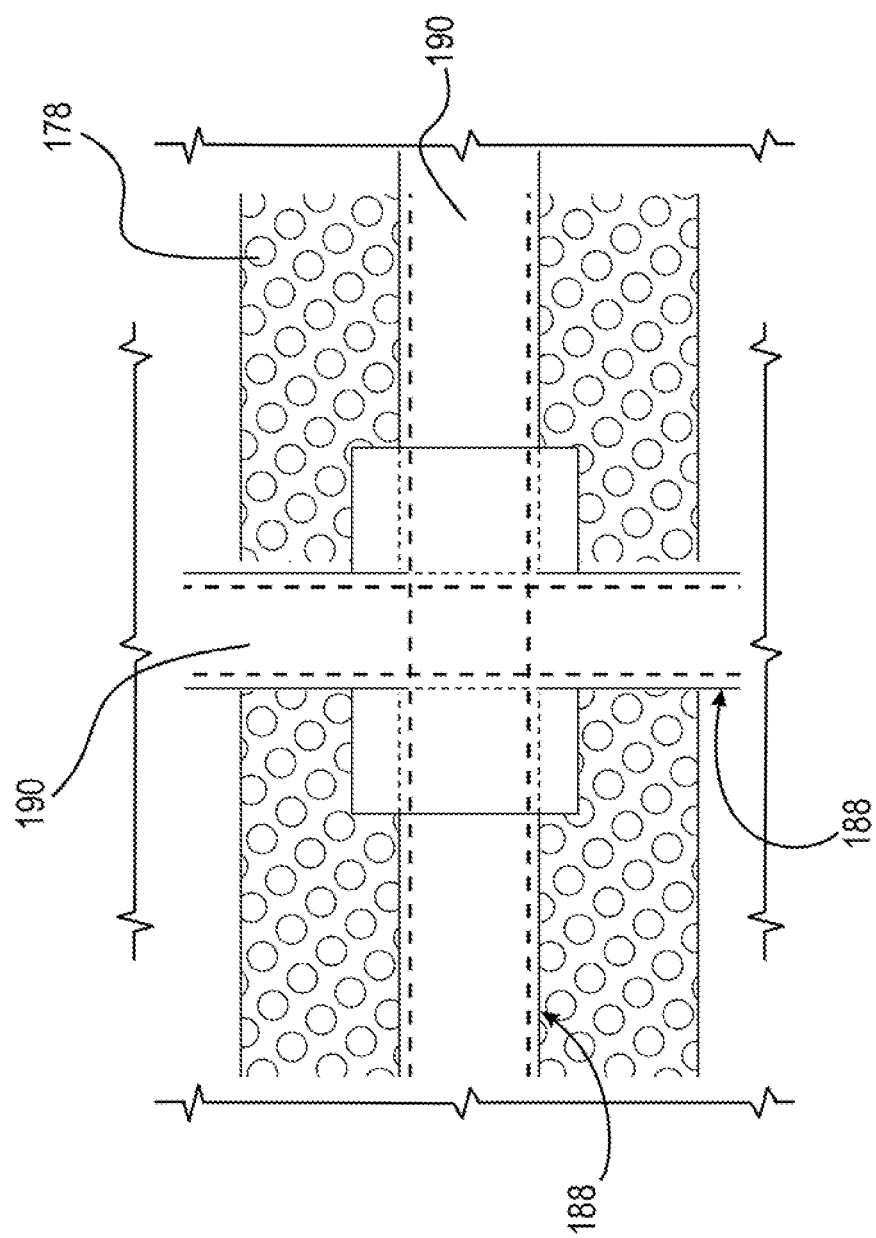
FIG. 11 is a top plan view of a sealing screen assembly showing a junction point of a gasket array; and, FIG. 12 is a partial cross sectional view of an embodiment of a sealing sheet material showing a multi-layer arrangement of the sealing sheet material.

In these embodiments, sealing screen assembly 176 comprises flexible screen material 178 and gasket array 180. Sealing screen assembly 176 is disposed between sheet of material 108 and inner wall 116 of vessel 102. The at least one bracing actuator, e.g., bracing actuator 134, urges sheet of material 108 into contact with flexible screen material 178 via mesh structure 112 and urges gasket array 180 into contact with portion 114 of inner wall 116 of vessel 102 thereby causing sealing contact between sheet of material 108 and portion 114 of inner wall 116 of vessel 102. In short, the sealing barrier blanket is deployed and sandwiched between the skeletal or mesh structure and the sealing screen assembly. This action may occur as described supra, or alternatively may occur as shown in FIG. 9 wherein rod 146 slides within slot 182 of connecting link 184 thereby effectively pinching mesh structure 112 against sealing blanket 108 and in turn sealing blanket 108 against sealing screen assembly 176. Sealing screen assembly 176 may be a perforated sheet formed from stainless steel, thermoplastic or thermoset resin, reinforced fiberglass, a carbon fiber material, or other similar materials known in the art. Mounted on outer surface 186 of sealing screen 178 are a plurality of spaced apart retaining channels 188. Although retaining channels 188 are depicted in an orthogonal arrangement, other arrangements are also possible, e.g., forming parallelograms therebetween, and such arrangements are within the spirit of the claimed invention. Gaskets 190 are positioned in and retained by retaining channels 188, as shown in FIGS. 10A (uncompressed) and 10B (compressed by compressive force F). Gaskets 190 may be formed from any compliant material known in the art, provided that such material is compatible, i.e., will not be degraded by, the liquid or gas held within the tank or vessel. Each intersection of gaskets, i.e., as shown in FIG. 11, is joined in such a manner as to form a seamless grid configuration upon outer surface 186 of screen material 178. The combined height of retaining channels 188 and gaskets 190 can be chosen based on the particular requirements for a tank or vessel, e.g., a particular tank manufacturer may wish to have a different safety rating thereby requiring a greater separation between the screen material and the inner wall of the tank.

The grid pattern formed by the gasket material mounted on the face of the perforated screen causes the creation of "cells" when the gasket is compressed against the tank wall. The "cells" effectively act as individual zones of isolation. Because the sealing screen assembly stands off and away from the inner wall of the tank or tank car, the zones or cells of isolation provide a dead space buffer zone. Only a nominal amount of fluid loss would be experienced at the site of damage to the tank wall because leakage is limited only to the volume of the affected cell or cells encompassing the damaged area or areas. In short, the gaskets seal about the entire inner wall of the tank simultaneously and prevent fluid from reaching the damaged area.

The perforated screen offers protection to the inner sealing blanket material from penetrating objects or shards of sharp metal as it is constructed of cut, abrasion and puncture resistant material, e.g., synthetic and/or metal material. The perforated screen thickness is optimized so that it can deform to accommodate objects that penetrate into the tank void. The small aperture diameter, e.g., ¼ inch, of the perforated screen will generally not allow sharp shards of metal from a torn steel tank wall to compromise the inner sealing material blanket. However, it should be appreciated that the inner sealing material blanket has built in protection from leakage due to punctures, cuts and abrasions because it is multi-layered, as described supra, and because of the unique feature that the innermost core layer is not bonded to either the front or the back sealing layers. Should the outer sealing layer of the blanket be compromised, the puncture, cut and abrasion resistant core layer protects the final inner sealing layer of the sealing blanket.

When activated, the deployment mechanism pulls the synthetic sealing blanket around and in between the outer perforated screen and the existing inner skeletal or mesh structure. Once the sealing blanket is deployed, the hydraulics then operate to expand outwards the skeletal or mesh structure and continuing outwards until it is seated and compressed together with the outer perforated screen assembly thereby sandwiching and compressing the deployed sealing blanket between the two structures. Continued hydraulic action then expands both the skeletal or mesh structure and the sealing screen assembly outwards until contact occurs between the gaskets mounted on the outer surface of the sealing screen assembly and the inner wall of the tank or vessel. Further hydraulic pressure then compresses the gaskets, the perforated screen, the sealing blanket and the skeletal/mesh structure together against the inner walls of the tank thereby sealing any leaks or failures of the tank or vessel.

The end portions of the tank or vessel may also be reinforced in a similar fashion as the foregoing arrangement. An end piece used to protect the heads of the tank can, in an embodiment, be a permanently mounted dish shaped assembly of the gasket, perforated screen, sealing blanket and inner mesh structure as set forth above, with the exception that the sealing blanket is permanently deployed. The end piece is inserted into the tank head void and compressed into position. The edges of the head piece may then be permanently affixed circumferentially to the inner tank car wall. When the system triggers and the skeletal structure expands, the outer portions of the skeletal structure will expand towards and seal against the permanent end piece.

It should be appreciated that the foregoing apparatus can be used in any liquid or gas storage container, and some embodiments include applications inside of railway tank cars and over the road tank trucks as an integral supplemental safety system.

The present invention comprises mechanical and electronic components designed for automatic high speed deployment of a flexible, multi-layered synthetic leak sealing barrier blanket to be applied to the inside walls of a storage tank or railway tank car in the event of an accident.

An automatic high speed deployment of the system occurs during a catastrophic event where sudden impact forces are experienced such as those encountered during a train derailment or truck collision. The system can also be triggered remotely by coded satellite or cellular phone signal, or manually by a panic switch in response to an acute situation such as an obstruction on the tracks.

In the case of a pressurized tank or railway tank car. The system may be deployed by a pressure differential situation where a compromise of the tank car shell produces a pressure drop that would be detected by pressure sensor, the signal from which would then automatically trigger the system.

The synthetic sealing material blanket deployed by the apparatus is intended to prevent or reduce fluid loss as would be otherwise experienced from damaged valves, fittings and minor cracks, tears, punctures, ruptures or similar compromises of the tank car shell. Once deployed, the synthetic sealing material blanket is then compressed into place and subsequently acts as a temporary containment method until recovery of the fluids contained therein can be accomplished.

The present invention rupture sealing apparatus is carried internally and represents a permanent, on demand safety mechanism. The expandable skeletal structure is unique in positioning and compressing the synthetic sealing material against the tank wall. The synthetic sealing material is automatically deployed upon detection of a failure condition. The deployment is triggered by any of a variety of user defined conditions including: impact forces, i.e., acting like an automobile air bag, pressure differential, low level sensors, encoded cellular or satellite phone signals, a panic switch or the like. The present invention is capable of sealing multiple leaks both simultaneously and instantaneously.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A system for sealing a vessel, comprising:
a sealing assembly including a sheet of material and an actuator; and,
a bracing assembly including a mesh structure, wherein in response to an actuating signal:
the actuator is arranged to dispose the sheet of material along at least a portion of an inner wall of the vessel; and,
the bracing assembly is arranged to displace the mesh structure such that the mesh structure urges the sheet of material into sealing contact with the at least a portion of the inner wall, wherein:
the sealing assembly comprises a plurality of cables engaged with an end of the sheet of material and at least partially disposed in a space between the mesh structure and the inner wall; and,
the actuator is arranged to pull the plurality of cables to draw the sheet of material through the space between the inner wall and the mesh structure and along the at least a portion of the inner wall.

2. The system of claim 1 wherein:
the sealing assembly comprises a storage element for holding at least a portion of the sheet of material; and,
the actuator is arranged to operate on a first end of the sheet of material to draw the sheet of material away from the storage element to dispose the sheet of material along the at least a portion of the inner wall.

3. The system of claim 2 wherein:
the storage element comprises a rotatable spindle about which the at least a portion of the sheet of material is spooled; and,
a second end of the sheet of material is fixed to the spindle.

4. The system of claim 3 wherein the rotatable spindle is spring loaded to resist rotation of the spindle to unspool the sheet of material.

5. The system of claim 1 wherein the mesh structure comprises:
a first plurality of members aligned with a longitudinal axis for the vessel; and,
a second plurality of members connected to the first plurality of members and disposed orthogonal to the first plurality of members.

6. The system of claim 1 wherein:
the bracing assembly comprises at least one bracing actuator connected to the mesh structure; and,
the at least one bracing actuator is arranged to displace the mesh structure toward the inner wall to urge the sheet of material into the sealing contact with the at least a portion of the inner wall.

7. The system of claim 6 wherein the at least one bracing actuator is arranged to urge the mesh structure at least partially in a circumferential direction to urge the sheet of material into the sealing contact with the at least a portion of the inner wall.

8. The system of claim 1 further comprising:
a sealing screen assembly comprising a flexible screen material and a gasket array, wherein the sealing screen assembly is disposed between the sheet of material and the inner wall of the vessel, and the bracing assembly urges the sheet of material into contact with the flexible screen material and urges the gasket array into contact with the at least a portion of the inner wall of the vessel thereby causing sealing contact between the sheet of material and the at least a portion of the inner wall of the vessel.

9. A system for sealing a vessel, comprising:
a bracing assembly comprising:
a mesh structure; and,
at least one bracing actuator engaged with the mesh structure; and,
a sealing assembly comprising:
an actuator;
a rotatable spindle;
a sheet of material spoolable about the rotatable spindle, the sheet of material comprising first and second ends, wherein the second end is connected to the spindle;
a plurality of cables at least indirectly connected to the first end of the sheet of material, at least partially disposed in a space between the mesh structure and an inner wall of the vessel, and engaged with the actuator, wherein in response to an actuating signal:
the actuator is arranged to retract the plurality of cables to:
pull the sheet of material off the rotatable spindle and through the space between the mesh structure and the inner wall; and,
dispose the sheet of material along at least a portion of the inner wall; and,
the at least one bracing actuator is arranged to displace the mesh structure such that the mesh structure urges the sheet of material into sealing contact with the at least a portion of the inner wall.

10. The system of claim 9 further comprising:
a sealing screen assembly comprising a flexible screen material and a gasket array, wherein the sealing screen assembly is disposed between the sheet of material and the inner wall of the vessel, and the at least one bracing actuator urges the sheet of material into contact with the flexible screen material and urges the gasket array into contact with the at least a portion of the inner wall of the vessel thereby causing sealing contact between the sheet of material and the at least a portion of the inner wall of the vessel.

11. The system of claim 9 wherein the actuating signal is produced by a data analysis unit arranged to determine occurrence of an unsafe condition of the vessel, the data analysis unit comprising a sensor selected from the group consisting of: a global positioning system (GPS), an inertial sensor, an impact sensor, a liquid level sensor, a pressure differential sensor, a gyroscopic sensor, an accelerometer, a laser valve measurement sensor, a sonic valve measurement sensor, and electronic valve measurement sensor and combinations thereof.

12. A method for sealing a vessel using a system including a sealing assembly with a sheet of material and an actuator and including a bracing assembly with a mesh structure, the method comprising:
receiving an actuating signal;
disposing, using the actuator, the sheet of material along at least a portion of an inner wall of the vessel; and,
displacing the mesh structure to urge the sheet of material into sealing contact with the at least a portion of the inner wall
wherein the sealing assembly comprises a plurality of cables, the method further comprising:

engaging the plurality of cables with an end of the sheet of material;

at least partially disposing the plurality of cables in a space between the mesh structure and the inner wall; and, pulling, using the actuator, the plurality of cables to draw the sheet of material through the space between the inner wall and the mesh structure and along the at least a portion of the inner wall.

13. The method of claim 12 wherein the sealing assembly comprises a storage element for holding at least a portion of the sheet of material, the method further comprising operating, with the actuator, on a first end of the sheet of material to draw the sheet of material away from the storage element to dispose the sheet of material along the at least a portion of the inner wall.

14. The method of claim 13 wherein:

the storage element comprises a rotatable spindle about which the at least a portion of the sheet of material is spooled; and, a second end of the sheet of material is fixed to the rotatable spindle.

15. The method of claim 14 wherein the rotatable spindle is spring loaded to resist rotation of the spindle to unspool the sheet of material.

16. The method of claim 12 wherein the mesh structure comprises:

a first plurality of members aligned with a longitudinal axis for the vessel; and, a second plurality of members connected to the first plurality of members and disposed substantially orthogonal to the first plurality of members.

17. The method of claim 12 wherein the bracing assembly comprises at least one bracing actuator, the method further comprising:

connecting the at least one bracing actuator to the mesh structure; and, displacing, using the at least one bracing actuator, the mesh structure toward the inner wall to urge the sheet of material into the sealing contact with the at least a portion of the inner wall.

18. The method of claim 17 further comprising using the at least one bracing actuator to urge the mesh structure at least partially in a circumferential direction to urge the sheet of material into the sealing contact with the at least a portion of the inner wall.

* * * * *